356-138。 SR
1-15-74 OR 3,785,738

United States Patent [19]
Hoppke

[11] 3,785,738
[45] Jan. 15, 1974

[54] MULTI-ANGLE BEAM DIRECTOR FOR TESTING APERTURE MASKS

[75] Inventor: Jerell B. Hoppke, Ham Lake, Minn.

[73] Assignee: Buckbee-Mears Company, St. Paul, Minn.

[22] Filed: Oct. 21, 1971

[21] Appl. No.: 191,522

[52] U.S. Cl. .................. 356/138, 356/225, 356/237, 356/239, 350/199, 250/219 DE
[51] Int. Cl. .......................................... G01n 21/16
[58] Field of Search .................... 356/138, 172, 201, 356/213, 225, 237, 239; 250/219 DF, 219 R; 350/299

[56] References Cited

UNITED STATES PATENTS

| | | | |
|---|---|---|---|
| 1,848,874 | 3/1932 | Fitzgerald | 356/201 |
| 3,475,615 | 10/1969 | Samuel | 250/219 DF |
| 3,361,025 | 1/1968 | Gaffard | 250/219 DF |
| 3,620,627 | 11/1971 | Davies | 356/239 X |

*Primary Examiner*—Ronald L. Wibert
*Assistant Examiner*—Paul K. Godwin
*Attorney*—Marvin Jacobson et al.

[57] ABSTRACT

A testing apparatus for television aperture masks in which four mirrors are adjustably mounted in a frame so as to be insertable in a conventional optical densitometer testing device to divert transmitted light from a path generally perpendicular to the surface of the aperture mask to a path of a predetermined angle through the mask.

4 Claims, 4 Drawing Figures

INVENTOR
JERELL B. HOPPKE
BY Stryker & Jacobson

INVENTOR
JERELL B. HOPPKE
BY Stryker & Jacobson

MULTI-ANGLE BEAM DIRECTOR FOR TESTING APERTURE MASKS

BACKGROUND OF THE INVENTION

In the prior art relating to the testing of color television tube aperture masks, it is conventional practice to utilize an instrument referred to as an optical densitometer which directs light generally orthogonally through an aperture mask and measures the amount of radiation passed by the small perforations in the mask as a measure of the size of the perforations. If the holes have been etched to too great a diameter, the amount of radiation passing through the mask will be too large and conversely inadequately etched holes will pass too little radiation. Instruments to perform this test typically comprise a suitable flat surface upon which the aperture mask is positioned and a light source, either above or below the aperture mask with a corresponding light measuring detector on the opposite side of the mask. This test, although fairly accurate with respect to the total cross-sectional area of the mask as viewed orthogonally, does not present a true picture of the total performance to be expected from the particular aperture mask being tested. The holes in reality are not cylindrical but rather have angled sides so as to allow the electron beam in the television tube to pass through at angles up to more than 40°. However, if the sides of the holes are not properly etched the angled portion may not extend from one side of the mask to the other and small imperfections can result. These will not be apparent when the aperture mask is tested in an orthogonal position by the passage of light but will still cause a clipping or shadowing effect at increased angles of incidence. In the prior art, production processes have relied upon continual examination of the masks to ensure that the holes therein are properly angled to prevent clipping. Examination of the mask has previously required that the mask be cut up into small pieces which are then carefully sectioned and microscopically examined to determine the character of the etched perforations. This process has proved to be so time consuming that by the time imperfections are discovered a great number of aperture masks have been formed with imperfect holes. Thus, a need has been present for some type of system to test quickly whether or not the side walls of the perforations in the aperture mask are properly angled so as to prevent clipping.

SUMMARY OF THE INVENTION

My invention contemplates a special optical system which can be used in conjunction with a standard densitometer to direct light through the aperture mask at an angle approximating those angles which may be encountered during the operation of the television picture tube. If any clipping of the electron beam could be caused by the tested mask, the light beam will also be clipped and this reduction in transmitted light is measurable with a high degree of accuracy.

In the interests of very low costs and high speed testing, it is undesirable that an entirely separate instrument be provided. Thus, it is preferable that some modification be made to the conventional densitometers now common to the industry to permit the mask to be measured both from a perpendicular position as a measure of the total hole size and from a desired angle as a measure of the degree of clipping. Since the tested or desired angle may vary from 30° to over 40°, it is further required that the testing instrument be adjustable. However, it is also required that the adjustment once made remain fixed so that it can be calibrated and correlated with the amount of perpendicular transmittivity. The present invention achieves all these needs by providing a mounting means which can be inserted directly into a conventional densitometer which mounting means contains a series of mirrors designed to take the light radiation which would normally travel along a direct path from the light source to the detector and divert that radiation from the direct path to a second mirror. The second mirror causes the radiation to cross back through the path at the same testing point originally used but at an angle to the direct path corresponding to the desired test angle. Two more mirrors are then used to recapture the radiation and direct it back along the original path into the conventional densitometer. Thus, it may be seen that it is an object of my invention to provide an improved aperture mask testing apparatus which is extremely low in cost, which can be used directly in combination with a conventional densitometer, and which will measure any clipping effect to be found in the tested mask. Further objects and advantages will become apparent upon consideration of the following description and drawings.

DESCRIPTION OF THE PREFERRED EMBODIMENT

Figures 1, 2:
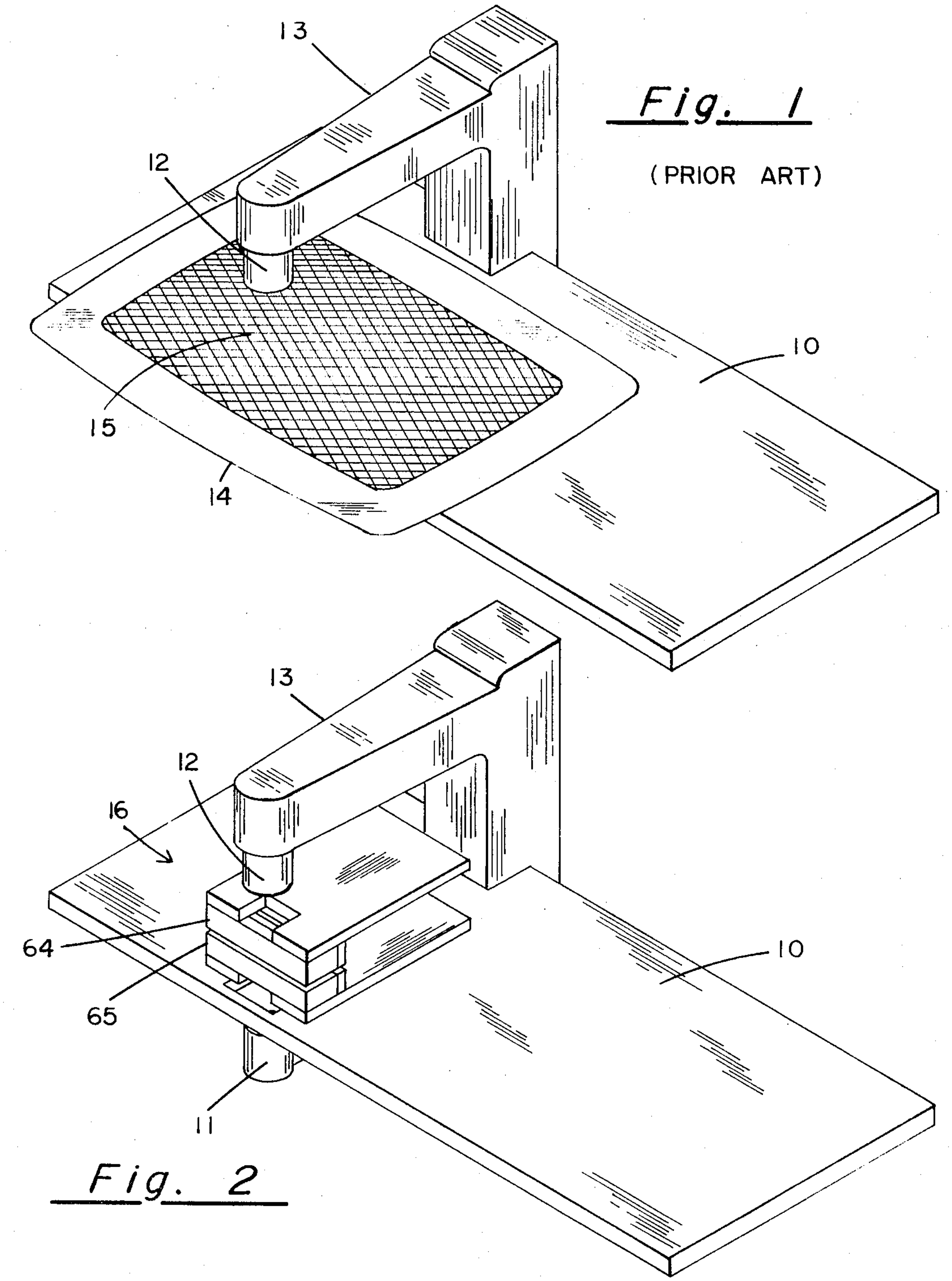
Fig. 1 (PRIOR ART) Fig. 2
FIG. 1 shows a typical prior art densitometer arrangement.
FIG. 2 shows how the present invention may be simply inserted into the conventional prior art densitometer to afford a measurement of clipping.

In FIG. 1 a typical prior art densitometer arrangement is shown wherein an aperture mask 14 which has a central foraminous area 15 comprising thousands of small perforations is mounted on a suitable working bench or surface 10. A light source 11 (visible in FIG. 2) transmits light up through foraminous area 15 to a light detector 12 mounted at the end of a suitable support arm 13. As mentioned before, the amount of light transmitted is indicative of the hole size in the foraminous area 15. The present invention permits the light traveling from source 11 to detector 12 to be transmitted through the aperture mask at a predetermined angle different from the orthogonal one found in the conventional densitometers. In FIG. 2 it may be seen that this is accomplished by the insertion of diverting means 16 between the radiation producing source 11 and the radiation detecting means 12. Means 16 is shown in greater detail in FIGS. 3 and 4.

Figure 3:
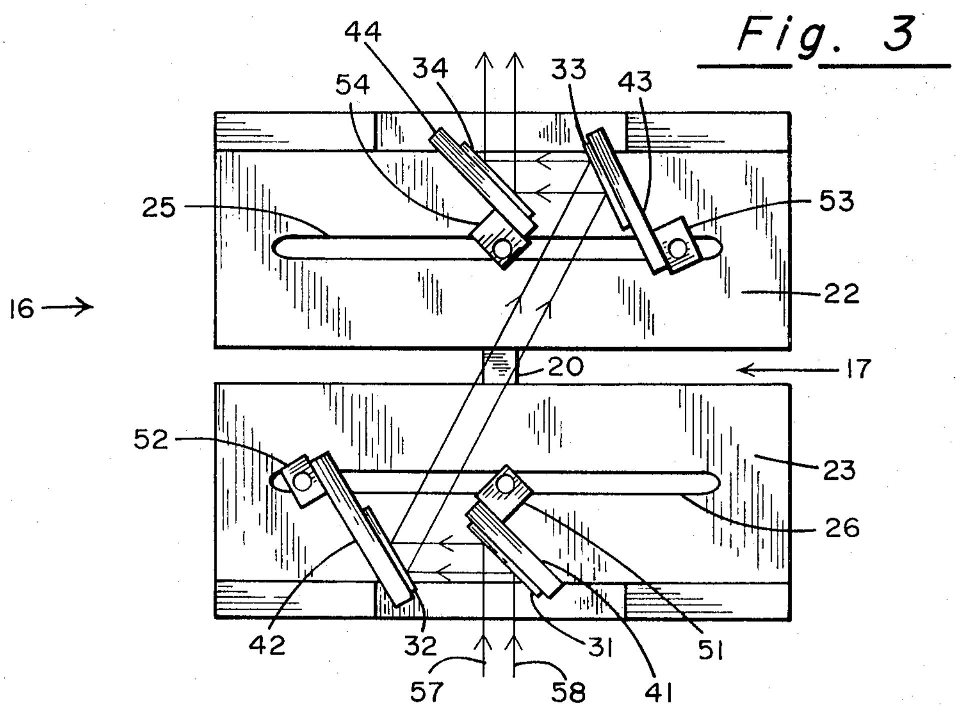
FIGS. 3 and 4 show respectively end and side views of the mirror arrangement of the present invention used to divert the radiation from the conventional direct path.
Figure 4:
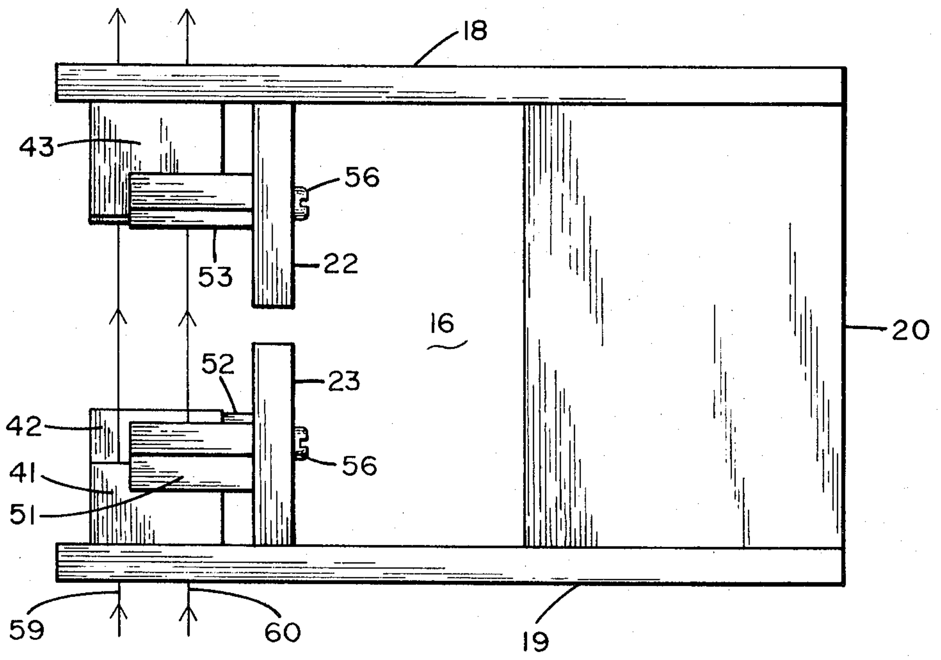

Referring simultaneously to FIGS. 3 and 4, it may be seen that means 16 is formed from a pair of top and bottom members 18 and 19 separated by a vertical wall 20. A pair of mounting members 22 and 23 are mounted to sides 18 and 19. The entire structure may be formed, for example, from molded plastic or the like. A pair of slots 25 and 26 are formed in mounting members 22 and 23. Four mirrors, numbered 31 through 34 are mounted by affixing them directly to four backing plates numbered 41 to 44 which in turn are connected to four mounting blocks numbered 51 through 54. Mounting blocks 51 through 54 are mounted in slots 25 or 26 by means of screws 56. It may readily be seen that the mirrors can be slid to the desired position, located at the correct angle, and firmly held in place by the tightening of screws 56. When correctly adjusted, the radiation from source 11 follows the path indicated by arrows 57, 58, 59 and 60. That is, the radiation entering along the original direct path from source 11 to detector 12 is diverted by mirror 31 to mirror 32 where it is reflected back through the original path at a point in line with a slot 17 between mounting members 22 and 23. Thus, the aperture mask may be inserted in slot 17 just as it was previously inserted between source 11 and detector 12 but now the radiation passing through the mask will do so at a predetermined angle whose magnitude depends on the particular design of television tube that the mask is intended for. Thus, the light passing through at an angle is attenuated to a degree depending upon the clipping action of the angled sides of the perforations in the aperture mask. The light is then recaptured by mirror 33 and directed back to the direct path where mirror 34 reflects it along the original direct path. Since the overall light transmission of an aperture mask positioned in slots 17 depends upon the clipping and the hole size, the mask may be conveniently tested by inserting it between the means 16 and the light detector 12 and measuring the transmitted radiation. The aperture mask may then be inserted into slot 17 and tested as described above. In the ideal case there would be no clipping at all and the two measurements should be identical. However, some clipping action is usually experienced and the difference in received radiation is a measure of the amount of that clipping action. It should be noted that in the actual operation of the invention the delicately mounted mirrors would be protected by a pair of caps 64 and 65 which extend over the end of testing means 16 as shown in FIG. 2. However, this arrangement is used in the preferred embodiment only and no limitation is intended to the invention with respect to the arrangement of apparatus for mounting the mirrors. The following claims are therefore presented to cover the novel concepts only without being limited to the particular structure shown in the preferred embodiment. The mounting means for the mirrors is one of many techniques that could be used and the configuration of the testing means 16 is by all means not the only approach that would be suitable. Likewise, it is contemplated that prisms could be substituted for the more conventional mirrors.

I claim:

1. In apparatus for testing the openings in a color television aperture mask by measuring the amount of radiation passing through the openings coming from a radiation producing source and going to a radiation measuring detector, the improvement comprising:

radiation directing means positioned between said producing source and measuring detector so as to divert radiation away from a direct path that passes generally perpendicularly through said aperture mask from said producing source to said measuring detector and then back across said direct path at a predetermined angle relative to said generally perpendicular direct path so as to pass through said aperature mask and then back into alignment with said direct path so as to reach said measuring detector.

2. The apparatus of claim 1 in which said support means further comprises guide means for inserting an aperture mask generally at the point where the diverted radiation crosses back through said direct path.

3. The apparatus of claim 2 in which said radiation directing means comprises a first reflecting means positioned to block said direct path and divert the radiation, a second reflecting means positioned to receive the diverted radiation and reflect it back through the direct path in an intersection manner, a third reflecting means positioned to receive the diverted radiation from said second reflecting means and return it to the direct path, and a fourth reflecting means in said path positioned to receive radiation from said third means and re-direct it along and coincident with said direct path.

4. The apparatus of claim 3 in which said first, second, third and fourth reflecting means comprises mirrors mounted on four blocks which are adjustably secured to said testing base.

* * * * *

UNITED STATES PATENT OFFICE
CERTIFICATE OF CORRECTION

Patent No. 3,785,738 Dated January 15, 1974

Inventor(s) Jerrell B. Hoppke

It is certified that error appears in the above-identified patent and that said Letters Patent are hereby corrected as shown below:

In Col. 4, lines 25 and 26, change "in which said support means further comprises" to -- including --.

In Col. 4, line 44, delete "to said testing base".

Signed and sealed this 8th day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334